June 20, 1967     N. D. TRBOVICH     3,326,560
ADJUSTABLE AND WEAR-RESISTANT SEAL
Filed Sept. 13, 1965     2 Sheets-Sheet 1

INVENTOR.
NICHOLAS D. TRBOVICH
BY
Christel & Bean
ATTORNEYS

United States Patent Office 3,326,560
Patented June 20, 1967

3,326,560
ADJUSTABLE AND WEAR-RESISTANT SEAL
Nicholas D. Trbovich, 59 Fieldcrest Court,
West Seneca, N.Y. 14224
Filed Sept. 13, 1965, Ser. No. 496,219
9 Claims. (Cl. 277—102)

This application is a continuation-in-part of my copending application Ser. No. 211,570, filed July 23, 1962, now abandoned.

This invention relates generally to the seal art, and more specifically to a new and useful seal adapted to be made of metal and particularly designed for diametral sealing.

A primary object of my invention is to provide a diametral seal for rotating and reciprocating parts, as well as for static installations.

Another object of my invention is to provide a diametral seal adapted for use against a moving part and having means compensating for wear.

Another object of my invention is to provide a diametral seal having means automatically compensating for wear.

An additional object of my invention is to provide a diametral seal having means compensating for dimensional variations resulting from manufacturing tolerances.

Still another object of my invention is to provide a diametral seal for moving parts having means for adjusting the amount of friction on the bearing surfaces.

A further object of my invention is to provide a diametral seal having means for expanding the sealing member, to adjust the sealing pressure and to compensate for wear, wherein the expanding means are confined to such function and maintained out of sealing engagement with the surfaces being sealed.

It is also an object of my invention to provide the foregoing in a relatively simple and inexpensive construction which is both durable and dependable in operation.

In one aspect thereof, a seal constructed in accordance with my invention is characterized by the provision of a sealing member having an apex and walls diverging therefrom, the walls having surface-engaging sealing portions adjacent their outer ends, and an expanding member substantially coextensive in length with the sealing member and positioned between the walls thereof, the expanding member being movable relative to the sealing member toward the apex thereof and engaging the sealing member walls adjacent the outer ends thereof for expanding the sealing member by spreading apart the walls thereof when the expanding member is moved inwardly of the sealing member toward its apex.

In yet another aspect thereof, a seal constructed in accordance with my invention is characterized by the provision of a sealing member having an apex and walls diverging therefrom, the walls having surface-engaging sealing portions adjacent the outer ends thereof, and a resiliently compressible expanding member substantially coextensive in length with the sealing member positioned between the walls thereof for urging the walls apart to compensate for wear of the sealing portions.

The foregoing and other objects, advantages and characterizing features of the seal of my invention will become clearly apparent from the ensuing detailed description of certain illustrative embodiments thereof, taken in conjunction with the accompanying drawings illustrating the same wherein like reference numerals denote like parts throughout the various views, and wherein.

Figure 2:
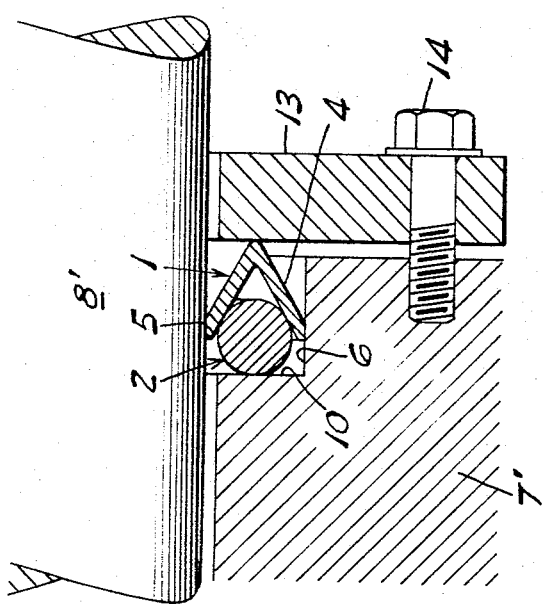
FIGS. 2, 3 and 4 are corresponding views of the same seal in three different seal cavity arrangements.

Referring now in detail to the accompanying drawings, the seal of my invention shown in FIGS. 1–4 comprises the combination of a sealing member 1 and an expanding member 2. Sealing member 1 is annular, and has a general V-shaped transverse section providing an apex 3 and a pair of diverging walls 4. The outer sides of walls 4 are flattened, adjacent their outer ends, to form laterally outwardly facing, surface-engaging sealing portions 5 which provides a substantial area of sealing contact.

It is contemplated that sealing member 1 be made of metal, wtih the diverging legs 4 comprising resiliently yieldable cantilever beams. The sealing portions 5 are parallel in use, and seal against the adjacent cavity surfaces, comprising in FIG. 1 an internal wall 6 in housing 7, and the periphery of shaft 8. It is contemplated that sealing member 1, or at least its sealing portions 5, will have a metal or plastic coating, well known per se and therefore not shown, which will deform and cold flow into any surface irregularities in wall 6, or any other static sealing surface, to provide a good seal therewith.

Because shaft 8 rotates against the inner sealing portion 5, it will gradually wear the same and might thereby destroy the sealing action.

However, with the seal of my invention this undesirable result is avoided, and such wear can be compensated for. Also, the amount of bearing friction between shaft 8 and sealing member 1 can be adjusted. This is accomplished by the expanding member 2 comprising a ring which is split, as shown at 9 (FIGS. 3 and 4), and which is positioned between the walls 4 of member 1 adjacent the outer ends thereof.

Expanding member 2 has a sectional diameter approximating and substantially no greater than the spacing between the outer ends of walls 4 in the unstressed or relaxed state of sealing member 1. This is important, because it permits member 2 to enter the cavity of sealing member 1, between walls 4 while causing it to bear against the walls adjacent the outer ends thereof.

By confining expanding member 2 within sealing member 1, it is constrained to perform only its intended function of expanding the sealing member. Expanding member 2 does not and should not itself spread into contact with either shaft 8 or wall 6, because it is not a sealing member. Inasmuch as the outer ends of walls 4 are only a few thousandths of an inch thick, it is important that expanding member 2 be laterally confined between walls 4 of sealing member 1, in order to avoid such contact. By causing expanding member 2 to engage walls 4 adjacent the outer, sealing portion ends thereof, undesired stressing of the walls, adjacent the apex, is avoided. If desired, walls 4 can be provided with reinforced intermediate sections, as set forth in my pending application Ser. No. 211,569, filed July 23, 1962, now Patent 3,207,524 dated Sept. 21, 1965. As expanding member 2 is moved inwardly between walls 4, toward apex 3, it expands sealing member 1 by spreading apart the walls 4 thereof, and thereby urges the sealing portions 5 more tightly against shaft 8 and wall 6. By adjusting the position of expanding member 2 in sealing member 1, the degree of expansion or spreading apart of walls 4 can be varied, to compensate for wear on sealing portions 5, and to adjust the degree of friction and pressure between sealing portions 5 and the parts against which they engage.

The foregoing adjustment is accomplished by compressing the seal, between the exposed outer side of expanding member 2 and the apex 3 of sealing member 1. Thus, in the embodiment of FIG. 1, the seal is positioned in the body cavity for sealing on a diameter against cavity wall 6 and shaft 8. The side of expanding member 2 which projects outwardly beyond sealing member 1 presents a compression portion which is engaged by a wall 10 of the body cavity, while the opposite compression portion provided by the sealing member apex 3 engages against an opposing wall surface, comprising a shoulder 11 provided by a shaft section 12 of increased diameter.

Thus, by moving shoulder 11 toward cavity wall 10, the seal is axially compressed. This forces expanding member 2 inwardly of sealing member 1, toward its apex 3, and as it moves inwardly it forces the outer end portions of walls 4 radially outwardly, forcing sealing portions 5 into tighter sealing engagement with shaft 8 and wall 6.

It is contemplated that expanding member 2 also be made of metal. Its compressive strength exceeds the strength of the cantilever beams comprising walls 4, to perform its expanding function. The use of a wire ring is particularly advantageous, because of its ready availability and because of the inherently greater strength of a solid circular section over a cantilever beam.

The split 9 in expanding member 2 is important, because the separation between the ends, and the space thereby provided, permits adjustment of the diameter of member 2. This adjustment makes it unnecessary to maintain close tolerances, and enables the expanding member 2 to fit sealing members of different sizes. The annular shape of member 2 is important, to make it substantially coextensive with member 1 thereby to apply expansion forces substantially equally around sealing member 1.

Another arrangement of seal 1, 2 is illustrated in FIG. 2, wherein the sealing portions 5 of member 1 engage against a shaft 8' and a wall 6 of a cavity in body 7'. The projecting portion of the expanding member 2, comprising one compression portion, is engaged by the cavity wall 10, as in the embodiment of FIG. 1. However, the compression apex portion of member 1 is engaged by a collar 13 which encircles shaft 8' and is secured to body 7' by means of bolts, as shown at 14. Therefore, by simply tightening bolts 14, collar 13 will be displaced toward cavity wall 10 and expanding member 2 will be moved inwardly, toward apex 3, to expand sealing member 1 by spreading apart its walls 4 adjacent their outer ends.

Figure 3:
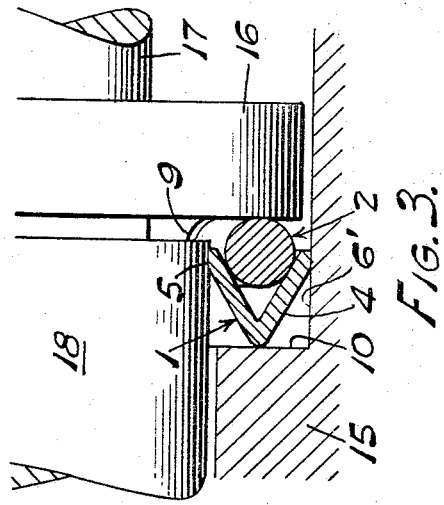

In the arrangement of FIG. 3, the relative positioning of the seal 1, 2 is reversed, and it is the apex 3 of member 1 which is engaged by the cavity wall 10 of a body 15. The outwardly projecting, compression portion of expanding member 2 is engaged by a collar 16, formed on or carried by a reduced diameter portion 17 of a shaft 18. One sealing portion 5 engages the periphery of shaft 18, and the other sealing portion 5 engages the cavity wall 6'.

It will be seen that, if shaft 18 is moved toward the left, relative to body 15, collar 16 will force expanding member 2 inwardly of sealing member 1, spreading apart walls 4, as before.

Figure 4:
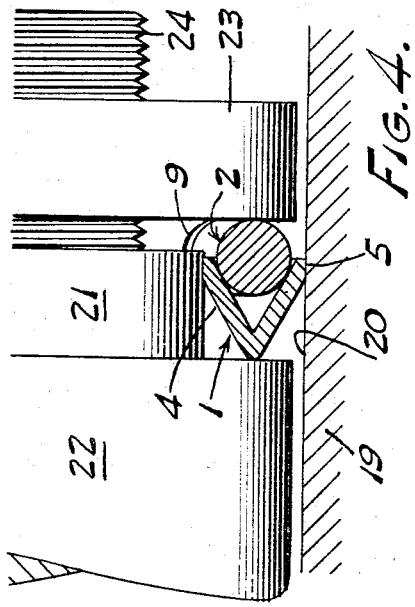

In the arrangement of FIG. 4, there is no radially offset cavity in the body 19, and one of the sealing portions 5 simply engages against the inner wall 20 of the body while the other sealing portion 5 engages against the periphery of a shaft portion 21. Apex 3 engages against a shaft part 22 of enlarged diameter, while expanding member 2 is engaged, and forced inwardly of member 1, by a collar 23 threaded on a shaft part 24. The seal 1, 2 functions as before.

Figure 5:
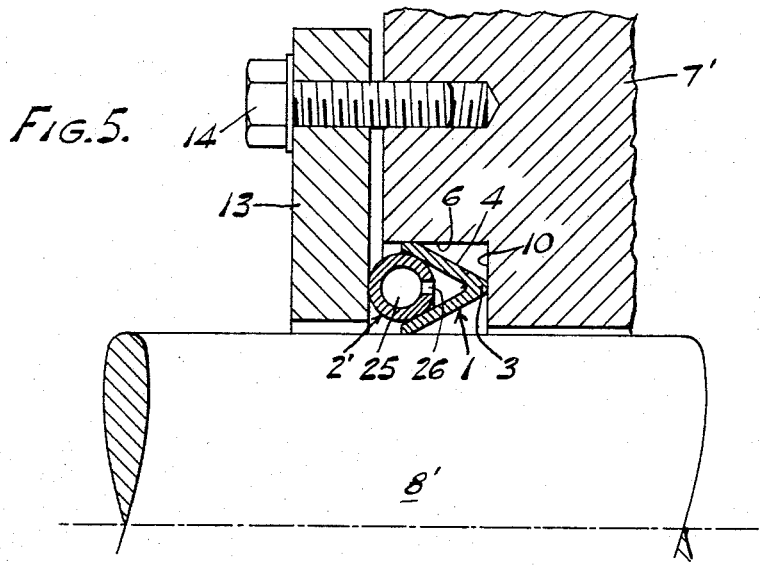
FIGS. 5 and 6 are corresponding views of a self-adjusting seal of my invention in two different cavity arrangements.
Figure 6:
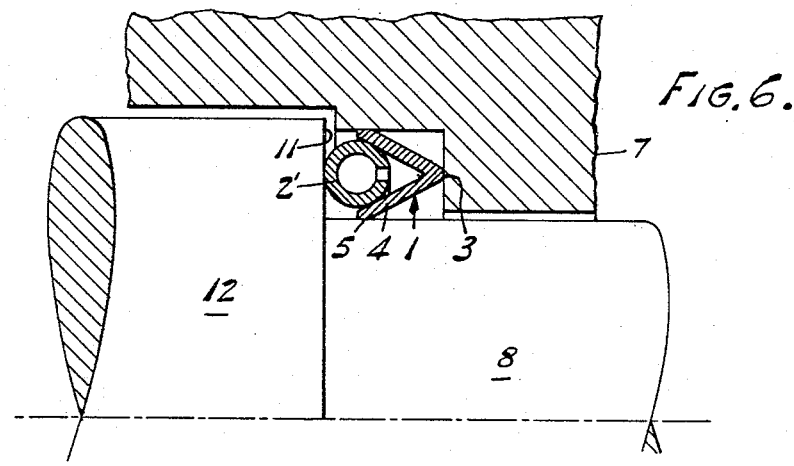
Figure 7:
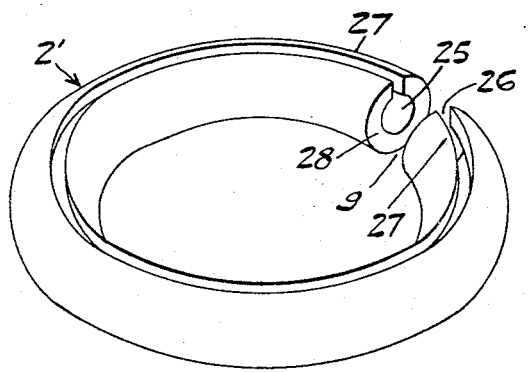
FIG. 7 is a perspective view o fthe expanding member used in the seal of FIGS. 5 and 6.

In the arrangement of FIGS. 5 through 7 there is provided a self-adjusting seal which does not require axial displacement of the expanding member 2' inwardly toward the apex of the sealing member 1 in order to further spread apart the walls 4 and thereby compensate for wear. Instead, compensation for wear of the surface engaging portions 5 of walls 4 is provided automatically by diametral expansion of a resiliently yieldable expanding member 2' which is initially compressed between walls 4 adjacent the outer ends thereof. Expanding member 2' is an annular, elastically deformable member having therein a channel 25 and a side wall slot 26 both of which are co-extensive in length therewith, providing opposed side wall sections 27 resiliently yieldable toward each other and connected by a spring hinge section 28 integral therewith, the section 28 being opposite slot 26.

Channel 25 and slot 26 are conveniently formed by constructing member 2' of resiliently yieldable, tubular stock having slot 26 cut through the wall thereof, the term tubular being used in a broad sense to include shapes other than the preferred, cylindrical bore form shown.

Expanding member 2' in its unstressed condition has a sectional diameter approximately equal to and substantially no greater than the spacing between the outer ends of walls 4 in the unstressed state thereof. As with member 2 of FIGS. 1–4, this permits member 2' to enter the cavity of member 1 while causing it to bear against walls 4 adjacent the outer ends thereof in substantially direct alinement with the surface-engaging sealing portions.

In the arrangement of FIG. 5, which corresponds to that shown in FIG. 2 except that the relative arrangement of the seal member and the expanding member in the cavity is reversed, expanding member 2' is moved axially inwardly toward apex 3 by tightening bolt 14 to displace collar 13 toward cavity wall 10. Apex 3 bears against wall 10 and collar 13 bears against expanding member 2'. Such inward movement of expanding member 2' expands the sealing member 1 by spreading apart the walls 4 thereof adjacent their outer ends. Once the intended sealing engagement of portions 5 against the cavity wall 6 and shaft 8' is established, further inward movement of expanding member 2' produces a compression thereof between walls 4, causing the resiliently yieldable side wall sections 27 of expanding member 2' to move toward each other. This springloads expanding member 2', with the result that walls 4 will be further spread apart to compensate for wear of sealing portions 5 automatically, without further displacement of collar 13 toward cavity wall 10. Instead, as the sealing portions 5 wear the resilient restoring force of the compressed expanding member 2' urges walls 4 outwardly to maintain the desired pressure of sealing engagement against shaft 8' and cavity wall 6.

The wear compensating, restoring action of expanding member 2' is continuous until the expanding member has been completely restored to its original, unstressed state. By proper design, this can be coextensive with the useful life of the seal. However, where particular conditions may dictate a different design, the collar 13 can be displaced during the life of the seal to again resiliently compress the expanding member 2' if necessary to compensate for additional wear.

Figure 1:
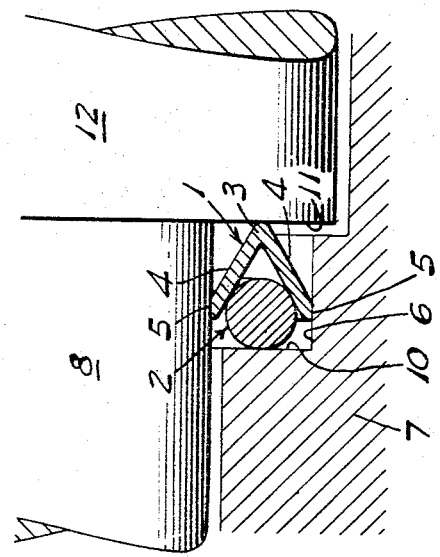
FIG. 1 is a longitudinal, quarter-sectional view of a seal of my invention, in one seal cavity arrangement.

The arrangement of FIG. 6 corresponds to that shown in FIG. 1 except that the position of the expanding member 2' and the seal member 1 in the cavity again is reversed. Also, the resiliently compressible expanding member 2' is used in FIG. 6 to compensate for wear automatically, without requiring displacement of the compression surface 11 toward the compression surface provided by cavity wall 10.

While expanding member slot 26 is shown directed axially inwardly toward apex 3 of seal member 1, it can be otherwise oriented. However, the illustrated arrangement is believed to be preferred for optimum results, and it is considered desirable to position the slot 26 out of contact with the compression surface against which the expanding member engages, this being surface 11 in FIG. 6 and the surface of collar 13 in FIG. 5.

As in the case of expanding member 2, the member 2' is transversely split, as shown at 9, providing ends which are spaced apart in the lengthwise, circumferential direction of the expanding member. This permits adjustment of the diameter of member 2', to fit sealing members 1 having variations in size whether due to manufacturing tolerances or otherwise.

It is contemplated that member 2' will be made of metal having the desired spring characteristics, although other materials can be used. However, the resilient restoring force of the member 2' must be sufficient to spread apart the walls 4, which themselves are resiliently yieldable, as the surface engaging sealing portions 5 wear away.

The embodiment of FIGS. 5 and 7 has the further advantage that ring 2' will follow member 1 upon expansion due to fluid pressure or to changes in temperature, thus ensuing positive seating of the seal throughout extremes of pressure and temperature ranges.

Thus, it is seen that my invention fully accomplishes its intended objects. There is provided a diametral seal which provides for adjusting sealing pressure, which compensates for wear of the sealing surface, and which accommodates dimensional variations resulting from manufacturing tolerances. All of this is provided in a relatively simple and inexpensive construction, which can be used to seal both rotating and reciprocating surfaces, as well as in static installations. By exposing the inside of members 1 to the higher pressure side of the seal, such higher pressure can be used to help expand the seal.

While I have disclosed and described in detail only two embodiments of my invention, that has been done by way of illustration only, without thought of limitation. The cross sectional configuration of members 1, 2 and 2' can be varied, as can the materials used in forming them. Such modifications and variations as will naturally occur to those skilled in the art to which this invention pertains, are intended to be included in the scope of the appended claims.

Having fully disclosed and completely described my invention, and its mode of operation, what I claim as new is:

1. In combination with a pair of opposed annular surfaces concentric about an axis and a pair of opposed compression surfaces spaced apart in the direction of said axis, means sealing said annular surfaces against leakage therebetween in the direction of said axis comprising a sealing member having an annular apex engaged against one of said compression surfaces and annular walls diverging from said apex, said walls having sealing portions adjacent the outer ends thereof engaging against said surfaces to be sealed, and a split annual expanding member positioned between said sealing member walls, said expanding member bearing against the other of said compression surfaces and against said walls adjacent said outer ends thereof for forcing said sealing portions against said surfaces to be sealed, said expanding member bearing against said walls in a plane substantially normal to said annular concentric surfaces and passing through said surface sealing portions, said expanding member having normally spaced apart opposed ends and being resiliently expansible in a direction varying the spacing of said opposed ends, wherein said expanding member is a tubular member of resiliently yieldable peripherally slotted side wall form.

2. In combination with a pair of opposed annular surfaces to be sealed spaced apart in a direction normal to an axis and a pair of opposed compression surfaces spaced apart in the direction of said axis, a self-adjusting seal comprising a sealing member having an annular apex engaged against one of said compression surfaces and annular walls diverging from said apex, said walls having sealing portions on the outer sides thereof adjacent the outer ends thereof engaging against said surfaces to be sealed, and an annular expanding member positioned between said sealing member walls, said expanding member bearing against the other of said compression surfaces and against the inner sides of said walls in a plane substantially parallel to said apex and passing through said surface engaging sealing portions for urging said sealing portions against said surfaces to be sealed, said expanding member having a channel and a side wall slot therein coextensive therewith and providing opposed side wall sections connected by a spring hinge section integral therewith, said side wall sections of said expanding member being resiliently yieldable and compressed toward each other between said sealing member walls, said expanding member having sufficient restoring force to expand and spread apart said walls to compensate for wear of said sealing portions.

3. A seal as set forth in claim 2, wherein said annular expanding member is split and has a pair of ends normally spaced apart lengthwise thereof, said split member being resiliently expansible for conforming to sealing members of different centerline diameters.

4. A seal set forth in claim 2, arranged in a cavity with said sealing member opening toward the high pressure side of said seal.

5. The combination set forth in claim 2, wherein said compression surfaces are relatively movable in the direction of said axis to move said expanding member inwardly between said walls.

6. A self-adjusting seal as set forth in claim 2, said expanding member comprising a tube of circumferentially slotted side wall form along the entire length thereof.

7. The combination of claim 2, wherein said expanding member is arranged with said side wall slot opening inwardly of said sealing member toward said apex.

8. In combination with a pair of opposed annular surfaces to be sealed spaced apart in a direction normal to an axis and a pair of opposed compression surfaces spaced apart in the direction of said axis, a self-adjusting seal comprising a sealing member having an annular apex engaged against one of said compression surfaces and annular walls diverging from said apex, said walls having sealing portions on the outer sides thereof adjacent the outer ends thereof engaging against said surfaces to be sealed, and an annular expanding member of tubular construction positioned between said sealing member walls, said expanding member bearing against the other of said compression surfaces and against the inner sides of said walls in a plane substantially parallel to said apex and passing through said surface engaging sealing portions for urging said sealing portions against said surfaces to be sealed, said expanding member being of resiliently yieldable continuously slotted wall form along the entire length thereof and being compressed between said walls, said expanding member having sufficient restoring force to expand and spread apart said walls to compensate for wear of said sealing portions.

9. A seal according to claim 8, wherein said expanding member is split transversely providing a pair of ends normally spaced apart lengthwise thereof, said expanding member being resiliently yieldable in a direction varying the spacing between its said ends.

References Cited

UNITED STATES PATENTS

| 332,793 | 12/1885 | Dickson | 277—125 |
| 1,811,012 | 6/1931 | Hodge | 267—1.5 |
| 2,895,758 | 7/1959 | Wright | 277—102 |
| 3,028,164 | 4/1962 | Parker | 277—112 |
| 3,047,300 | 7/1962 | Taylor et al. | 277—117X |
| 3,100,648 | 8/1963 | Lee et al. | 277—59 |

FOREIGN PATENTS 561,189    5/1944    Great Britain.

LAVERNE D. GEIGER, *Primary Examiner.*

SAMUEL ROTHBERG, J. S. MEDNICK,
*Assistant Examiners.*